United States Patent
Gutman

[11] Patent Number: 5,359,334
[45] Date of Patent: Oct. 25, 1994

[54] X-SCAN AIRCRAFT LOCATION SYSTEMS

[75] Inventor: John H. Gutman, Huntington, N.Y.

[73] Assignee: Hazeltine Corporation, Greenlawn, N.Y.

[21] Appl. No.: 4,357

[22] Filed: Jan. 14, 1993

[51] Int. Cl.$^5$ .......................... G01S 1/16; G01S 13/00; H01Q 13/00

[52] U.S. Cl. .................................. 342/408; 342/158; 343/777

[58] Field of Search ............... 342/408, 410, 411, 412, 342/413, 430, 375, 33–35, 429, 407, 445, 449, 361, 371, 372; 343/754, 777, 824, 408, 410–413, 158

[56] References Cited

U.S. PATENT DOCUMENTS

| | | | |
|---|---|---|---|
| 3,056,129 | 9/1962 | Albersheim | 342/158 |
| 3,242,491 | 3/1966 | Winter | 342/408 |
| 3,258,774 | 6/1966 | Kinsey | 342/368 |
| 3,286,260 | 11/1966 | Howard | 342/374 |
| 3,364,484 | 1/1968 | Best | 342/158 |
| 3,968,495 | 7/1976 | Hergenrother | 342/410 |
| 4,626,861 | 12/1986 | Wiley | 342/458 |

*Primary Examiner*—Gregory C. Issing
*Attorney, Agent, or Firm*—E. A. Onders; K. P. Robinson

[57] ABSTRACT

Linear array antenna systems are used in X-scan aircraft location systems and methods able to avoid disabling azimuth error conditions caused by multipath reflections under roll and pitch conditions during aircraft carrier landing operations. Aircraft azimuth and elevation data is derived based upon time of incidence at an aircraft location of two transverse, diagonally oriented, scanned antenna beams. The aircraft location data is derived by comparing time of incidence data with data on known timing of scanning of the beams, which have diagonally-oriented fan beam patterns. A plurality of vertically oriented radiating elements are typically positioned along a line diagonal to the vertical to produce a diagonally oriented fan beam pattern. Beam scanning results from relative adjustment of signal portions supplied to the radiating elements. While beam scanning is nominally diagonal, the vertical radiation cut-off characteristics of the elements constrain vertical radiation and thereby enhance provision of a desired horizontally oriented approach window. A particular embodiment uses spaced feeds along a traveling-wave input waveguide, with coupling to radiating elements by interconnecting waveguide sections of successively longer length, to provide broad-band equalization of signal supply path lengths.

23 Claims, 6 Drawing Sheets

X-SCAN AIRCRAFT LOCATION SYSTEMS

This invention relates to antenna systems providing diagonally oriented fan-type beam patterns, and to systems and methods for X-scan aircraft location systems utilizing two fan beams oriented diagonally in a transverse relation to provide X-scan coverage of an aircraft landing path to the flight deck of an aircraft carrier, for example.

BACKGROUND OF THE INVENTION

Existing aircraft landing systems, such as the present Microwave Landing System (MLS) as specified by international agreement, enable an aircraft preparing to land at an airport to derive data representative of aircraft location relative to the desired flight path to a runway. In such systems, ground-based antennas transmit a vertically-oriented fan beam which is scanned back and forth horizontally and a horizontally-oriented beam which is scanned up and down vertically. An aircraft flying through these cross-scanned beams carries a receiver capable of determining the time of incidence of the beams at the location of the aircraft. Data on such time of incidence is then used with data as to the timing of the scanning of the cross-scanned beams to derive information relating to the aircraft location relative to the runway or desired flight path.

In considering development of an aircraft landing system suitable for use by aircraft landing on an aircraft carrier, it was determined that additional constraints, such as caused by multipath sea reflection effects in the presence of roll and pitch conditions, limited the effectiveness of existing MLS capabilities. In addition to the fact that aircraft positional data may require correction to compensate for roll and pitch of the aircraft carrier, MLS system performance was determined to be subject to severe degradation of azimuth accuracy resulting from multipath reflections of signals from the surface of the water between the ship and an aircraft preparing to land, particularly in the presence of roll and pitch.

It is therefore an object of this invention to provide aircraft location systems having new and improved capabilities and, more particularly, to provide X-scan systems suitable for use in aircraft landing operations on aircraft carriers and such systems capable of operation in the presence of varying multipath reflections from the surface of the sea.

Further objects are to provide new and improved linear array antenna systems and methods operating with vertically aligned radiating elements to provide diagonally oriented fan beams which are scanned to provide horizontal coverage.

Additional objects are to provide diagonal fan beam antennas which can be constructed using sections of standard waveguide for wide band operation, and new and improved systems and methods which avoid disadvantages or shortcomings of the prior art.

SUMMARY OF THE INVENTION

In accordance with the invention, there is provided an X-scan aircraft location system which has first and second linear array antenna systems. The first linear array antenna system (for providing a first antenna beam pattern having a first diagonal orientation relative to vertical and horizontal normal coordinates) includes a linear array of radiating elements positioned along a line diagonal to such normal coordinates, with all of the radiating elements having a substantially parallel alignment with one of the normal coordinates. The first antenna system also includes: input line means, having an input port and coupling points successively spaced from the input port, for providing at successive coupling points signal portions which are subject to successively longer time delays; a plurality of connecting line means of successively shorter electrical lengths for coupling signal portions from the successively spaced coupling points to the radiating elements to provide successively shorter time delays substantially compensating for such successively longer time delays; and phase shift means, coupled to the radiating elements, for enabling relative phase adjustments of signal portions coupled to the radiating elements. The second linear array antenna system, includes radiating elements, input line means, connecting line means, and phase shift means as included in the first diagonal scan antenna system, in order to provide a second antenna beam pattern having a second diagonal orientation transverse to the first diagonal orientation. The X-scan aircraft location system also includes scan control means, coupled to the first and second linear array antenna systems, for controlling relative phase adjustments of the phase shift means of each of the first and second antenna systems to cause the first and second antenna beam patterns to be scanned transversely to each other, and processor means for utilizing data representative of time of incidence of the first and second antenna beam patterns at the location of an aircraft in determining the azimuth of the aircraft relative to a reference location.

Also in accordance with the invention, a method for determining aircraft azimuth relative to a seagoing vessel subject to roll, comprises the steps of:

(a) mounting an antenna system on a seagoing vessel at a position from which communication transmissions with an airborne aircraft are subject to multipath reflections;

(b) providing, from the antenna system, a diagonal fan-type first antenna beam pattern having a beam cross-section with an elongated dimension which is diagonally oriented at a first angle relative to a vertical coordinate;

(c) scanning the first antenna beam pattern;

(d) providing, from the antenna system, a diagonal fan-type second antenna beam pattern having a beam cross-section with an elongated dimension which is diagonally oriented at a second angle relative to the vertical coordinate and transversely oriented relative to the first antenna beam pattern;

(e) scanning the second antenna beam pattern;

(f) developing incidence data representative of the time of incidence of the first and second antenna beam patterns at the location of the aircraft; and (g) utilizing the incidence data to derive data representative of the azimuth of the aircraft relative to a reference position.

For a better understanding of the invention, together with other and further objects, reference is made to the following description taken in connection with the accompanying drawings and the scope will be pointed out in the appended claims.

DESCRIPTION OF THE INVENTION

Figure 1:
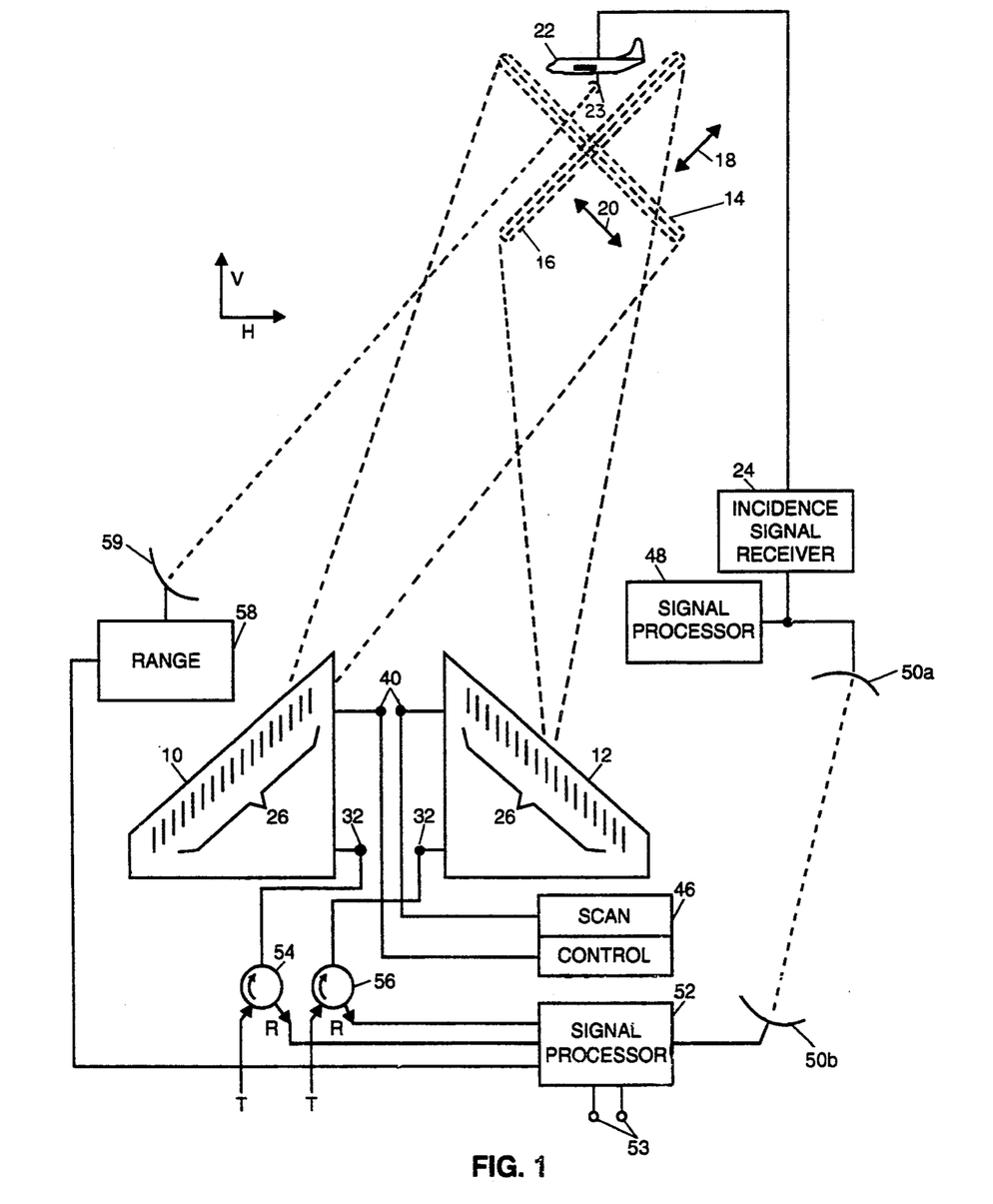
FIG. 1 is a conceptual view of an X-scan aircraft location system in accordance with the present invention.

FIG. 1 shows a conceptual diagram of an X-scan aircraft location system in accordance with the present invention. As will be further described with reference to figures illustrating aspects of the invention in greater detail, the FIG. 1 system includes first and second linear array antenna systems 10 and 12 which respectively provide diagonally oriented first and second fan beam antenna patterns having cross-sections as conceptually illustrated at 14 and 16, respectively. It will be appreciated that the antenna beam patterns are actually projected three-dimensionally upward and back onto a plane behind the plane of the drawing sheet. As shown, each of the fan beam antenna patterns 14 and 16 has a diagonal orientation relative to the vertical and horizontal reference coordinates, which are normal to each other as shown at V and H in FIG. 1. The word "diagonally" is used consistently with its dictionary definition to mean obliquely to a reference coordinate at any angle other than being perpendicular or parallel. As will be further explained, first beam pattern 14 is caused to be scanned, nominally in the dual directions indicated by arrow 18, by control of the phasing of signals provided to first antenna system 10. Correspondingly, second beam pattern 16 is scanned, nominally in the dual directions indicated by arrow 20, during operation of second antenna system 12. It will now be seen that while both beam patterns 14 and 16 are oriented diagonally to the vertical and horizontal normal coordinates, the beam patterns are also oriented transversely to each other. The resulting scanning of the beams 14 and 16 causes the beam patterns to intersect in a relationship defined for purposes of this application as an "X-scan". Also represented in FIG. 1 are an aircraft 22, at whose location the first and second fan beam patterns will be incident at times during beam scanning, and an incidence signal receiver 24 carried aboard the aircraft.

Figure 2:
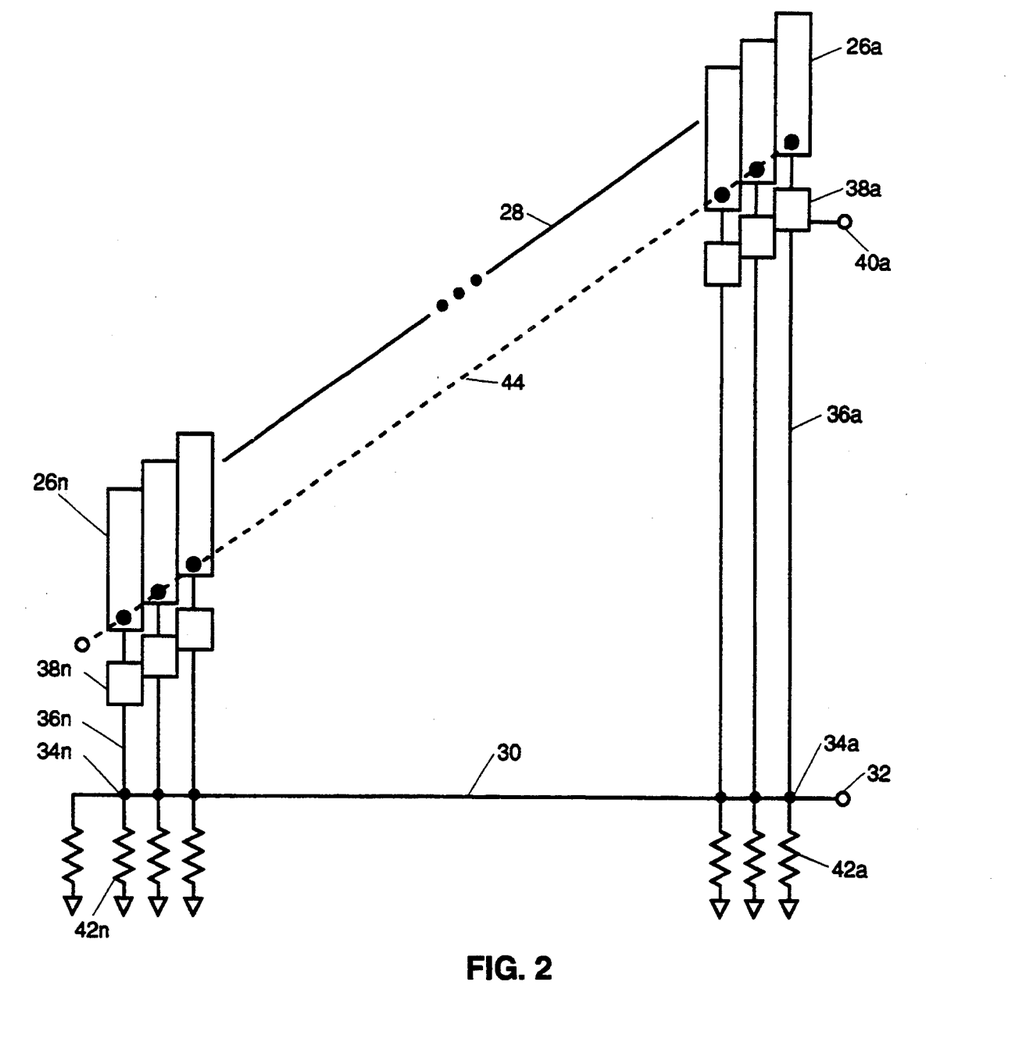
FIG. 2 shows a linear array antenna system in accordance with the invention.

Reference is now made to both the FIG. 1 X-scan aircraft location system and to FIG. 2, which shows a configuration of the first linear array antenna system 10 in greater detail. As illustrated in FIGS. 1 and 2, the X-scan system has a first linear array antenna system 10 including the following. A linear array of radiating elements, shown as vertically oriented slotted waveguide column sections 26a to 26n, is positioned along a line 28 which is at a 45° diagonal to the normal coordinates V and H. As shown, each of the radiating elements 26a to 26n is positioned along diagonal line 28, but is oriented vertically and has a parallel alignment with the vertical reference coordinate V. Input line means, shown as traveling-wave feed line 30, includes an input port, shown as terminal 32, and coupling points, shown as directional couplers 34a to 34n, which are successively spaced from input port 32 along the feed line 30. Connecting line means, shown as transmission line sections 36a to 36n, are coupled between respective ones of directional couplers 34a to 34n and radiating elements 26a to 26n. As shown, starting with line section 36a closest to input port 32, line sections of successively shorter physical and, therefore, electrical lengths connect to directional couplers 34a to 34n which are successively spaced from the input port 32. Thus, the longest line section 36a connects to the closest directional coupler 34a and the shortest line section 36n connects to the directional coupler 34n which is at the longest transmission distance from input port 32. Phase shift means, shown as phase shifter modules 38a to 38n, are coupled to respective ones of the radiating elements 26a to 26n. In one preferred embodiment the phase shift modules 38a to 38n were configured to fit within the cooperating waveguide sections comprising the slotted waveguide radiating elements 26a to 26n at their respective junctions with line sections 36a to 36n. Facilitating this arrangement, elements 26 and 36 were constructed of waveguide of the same cross-sectional dimensions. As shown, phase shift module 38a has a control terminal 40a to permit coupling of phase shift control signals from scan control means 46 shown in FIG. 1. Although not shown, each of phase shift modules 38a to 38n has a corresponding control terminal to enable relative phase adjustments for scanning purposes to be provided to each of the phase shift modules from scan control means 46. As noted, the feed line 30 in FIG. 2 may be arranged as a traveling-wave feed supplying input signals successively to the directional couplers 34a to 34n which are arranged and terminated in known manner, as by resistive loads 42a to 42n, to permit reciprocal transmit/receive operation. Also shown conceptually in FIG. 2 is a monitor waveguide arrangement, including a waveguide indicated at 44, which is coupled across the back of slotted-waveguide elements to enable monitoring of signals in the elements 26a to 26n (as further illustrated in FIG. 6).

The FIG. 1 X-scan aircraft landing system also includes a second linear array antenna system 12 which, in this embodiment is essentially a mirror image of the first antenna system 10. Thus, as indicated in FIG. 1, whereas first antenna system 10 includes a linear array of vertically-aligned slotted waveguide radiating elements 26 (i.e., elements 26a to 26n in FIG. 2) which are positioned along a line oriented at 45° from vertical, second antenna system 12 includes a similar linear array of identical radiating elements 26 positioned along a line oriented at 45° (i.e., at −45° from vertical). The second antenna system 12 also includes input lines means, connecting line means and phase shift means as described with reference to the first antenna system 10.

The FIG. 1 aircraft landing system further includes the following components. Scan control means 46 may comprise two similar sections respectively coupled to the phase shifter modules 38a to 38n of each of the first and second antenna systems 10 and 12. In this embodiment scan control means 46 is effective to control relative phase adjustments of the phase shift means (phase shifter modules) of each antenna to provide a scanned antenna beam pattern. Processor means, for utilizing data representative of time of incidence of the first and second antenna beam patterns at the location of an aircraft 22, are shown in FIG. 1 as including incidence signal receiver 24 (coupled to antenna 23) and signal processor 48 which receive and utilize time of incidence data in deriving information relating to the azimuth and elevation of aircraft 22 relative to a reference location. As shown in FIG. 1, the means for utilizing time of incidence data may include a data transmission link, represented by antennas 50a and 50b, to permit transmission of data between the aircraft and another location, such as the aircraft carrier, and also a carrier-based signal processor unit 52.

With this arrangement, incidence signals from receiver 24 may be transmitted for processing in signal processor unit 52 on the carrier or may be processed aboard the aircraft in signal processor unit 48, with azimuth and elevation data from unit 48 then transmitted to the carrier via antennas 50a and 50b. Range data for use in processor 52 may be developed on the basis of signal transmission time of signals sent by range signal unit 58, via antenna 59, to antenna 23 and returned from aircraft 23 via the same path, or in other known manner. Also shown in FIG. 1 are circulators 54 and 56 respectively connected to the input ports of antenna systems 10 and 12 to permit separation of transmitted signals and received signals, to enable each of the antenna systems 10 and 12 to be arranged for reciprocal transmit/receive operation in well-known manner. By coupling received signals (after reflection from the aircraft 22 in a radar mode of operation) to signal processor 52, azimuth and elevation data can be derived in unit 52, to provide a system not requiring the inclusion of airborne units 24 and 48. Alternatively, the X-scan antenna system may be operated in a receiving mode by receiving beacon-type signals transmitted from an aircraft while the antenna beam patterns of antenna systems 10 and 12 are scanned in a reception mode, with incidence data based on beam pattern scan angle at time of signal reception, as the reciprocal of the beam transmission mode first described. Terminals 53 permit signals providing data as to current roll and pitch conditions, as may be developed by other equipment aboard an aircraft carrier, to be coupled to unit 52 for use in roll and pitch correction or normalization of data relating to aircraft azimuth and elevation, or transmitted to airborne unit 48 for such purposes.

Nature of the Sea Reflection Problem

Figure 3A:
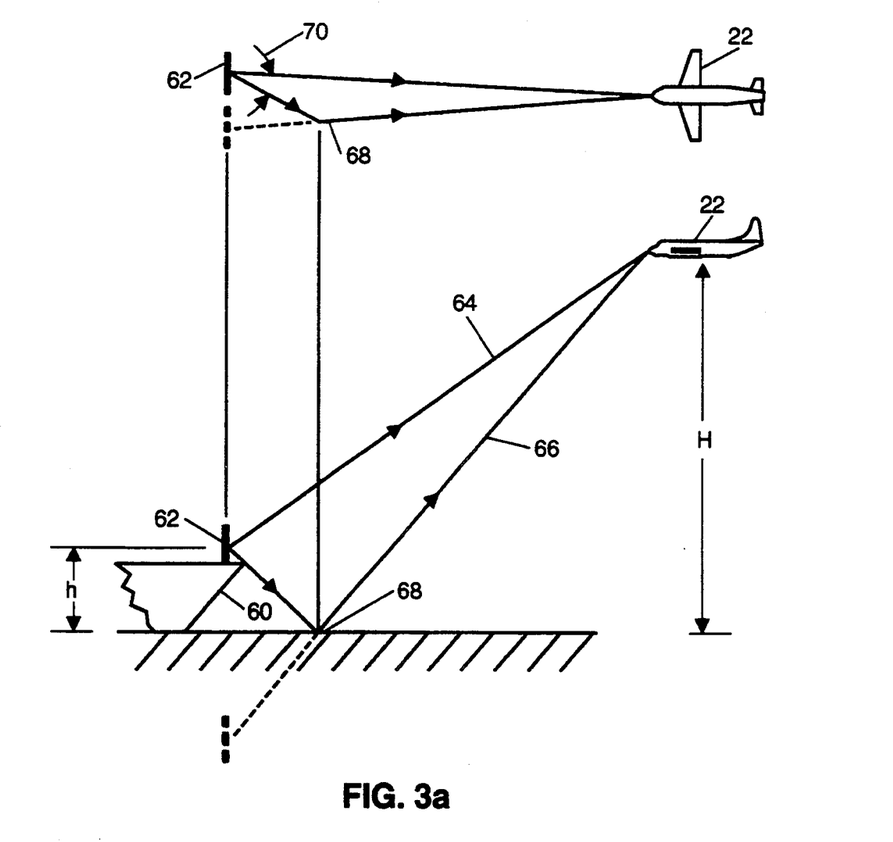
FIG. 3a illustrates multipath reflections affecting azimuth accuracy and FIG. 3b shows direct and multipath signal relationships.
Figure 3B:
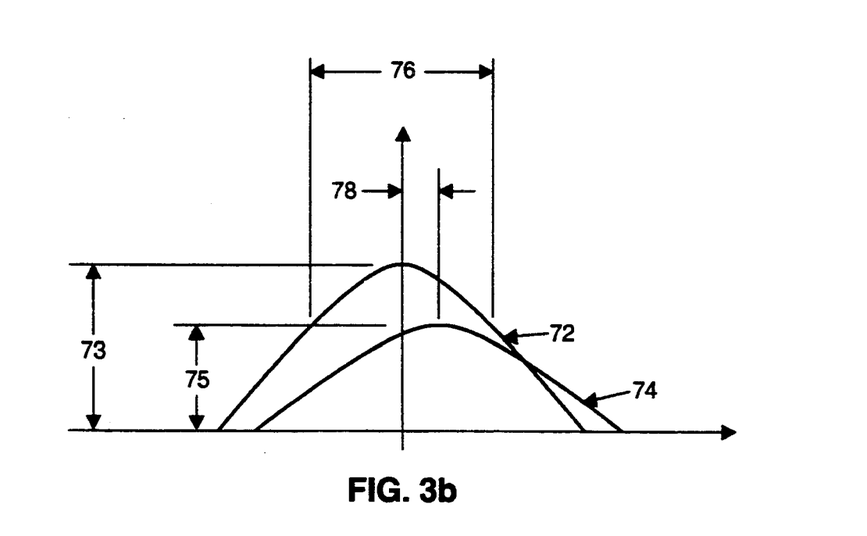

The nature of the multipath sea reflection problem as it affects a conventional horizontal scan line array is illustrated in FIGS. 3a and 3b. At the top of FIG. 3a there is shown a representation of a top or plan view of an aircraft 22 approaching a prior art type horizontal line array antenna 62, which may be mounted on an aircraft carrier. The horizontal array 62 is effective to produce a narrow fan beam having a basic vertical orientation. At the bottom of FIG. 3a the same aircraft and antenna are shown in a side view, with a portion of the aircraft carrier shown at 60. As shown in the lower view, signals from horizontal array 62 can reach the location of aircraft 22 either directly by path 64, or by path 66 after reflection from the sea or ocean surface. The effect of sea conditions causing roll of the aircraft carrier and resulting tilting of the horizontal array is shown in the upper view. As the roll of the carrier 60 tilts the horizontal array 62 so that it is no longer aligned horizontally, the fan beam strikes the water surface at a point 68 having a separation angle 70 between the direct path 64 between the antenna 62 and the aircraft 60. In FIG. 3b, curve 72 represents signal amplitude versus time as a beam of bandwidth 76 is scanned across the aircraft location, curve 74 represents signal amplitude versus time for the reflected version of the same beam (i.e., via path 66) and 78 represents the resulting effect of the multipath separation angle 70. As shown, the primary signal 72 has a maximum amplitude 73, while reflected signal 74 has a somewhat lower maximum amplitude 75. As will now be appreciated, the presence of the direct and reflected signals of relative amplitude and angular separation, which are subject to change depending upon pitch, roll, sea state and possible other variables, has the effect of introducing angle guidance and other possible errors in the operation of a landing system utilizing such a horizontal array antenna.

In considering this problem, it was determined that while the results of these error producing effects were so serious in seaborne operation of a horizontal line array in an MLS type system as to potentially result in unacceptable guidance angle accuracy, the resulting errors were typically only one-tenth as great in seaborne operation of a vertical line array antenna of the type producing a horizontal fan beam scanned vertically. It was further discovered that, in accordance with the invention, a diagonal line array (aligned at 45° to the vertical, for example) could be utilized in a landing system to provide an azimuth data development capability, while at the same time providing a level of immunity to guidance angle errors sufficient to avoid unacceptable guidance angle inaccuracies over a wide range of roll, pitch and sea state variables. Thus, the relative independence from multipath induced errors was discovered to apply to diagonally oriented fan beams over an extended range of typical operating conditions.

Operation of the System of FIGS. 1 and 2

Figure 4A:
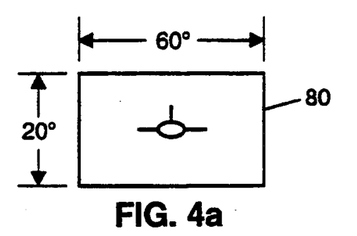
FIG. 4a illustrates an aircraft landing approach window.
Figure 4B:
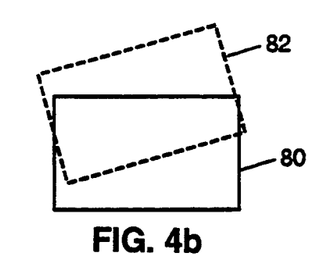
FIG. 4b shows effects of aircraft carrier roll and pitch.
Figure 4C:
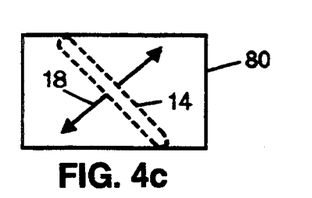
FIGS. 4c and 4d illustrate transverse diagonal scanning of first and second diagonally oriented antenna beams.

Referring now to FIG. 4a, there is illustrated an approach window 80 representing a scanned portion of airspace which is 20° in elevation and 60° in azimuth extending outward from the deck of an aircraft carrier and containing a preferred approach path for an aircraft landing on the carrier deck. As shown in FIG. 4c, if the carrier pitches and rolls while an aircraft is landing, the approach window may both tilt and move higher or lower relative to the aircraft position as shown at 82, so that the actual scanned portion of airspace must be larger than 20° in elevation and 60° in azimuth (i.e., an "enhanced approach window") if a fixed approach window area at least 20° high and 60° wide is to be covered at all times. Thus, the scanning beams of an aircraft landing system must scan an area larger than 20°×60°, so that an aircraft at the top of the approach window is not excluded from coverage when the carrier pitches, but, instead, stays within the enhanced approach window.

FIG. 4c shows the fan-shaped beam 14 of first diagonal scan antenna system 10 of FIGS. 1 and 2, which has a diagonal orientation of −45° relative to the vertical coordinate V and which is nominally scanned diagonally along a +45° direction as indicated by dual-direction arrow 18. The word "nominally" is used because it will be seen that the use of vertically oriented slotted waveguide column elements each having a predetermined radiation pattern characteristic vertically (i.e., vertical beam width factor) is effective to constrain the radiation of transmitted energy up into the sky or down toward the sea, as the beam pattern is scanned. If a prior art horizontal line array antenna was simply rotated to a 45° diagonal position and then scanned, the beam would simply scan diagonally with equal horizontal and vertical scan vector components. However, as shown in FIG. 2, in this embodiment of the invention each radiating element is a vertically aligned slotted waveguide column which provides a focusing factor providing upper and lower radiation pattern cut-off in the vertical dimension (i.e., 3 dB beam pattern points). As a result, when the FIG. 2 antenna is scanned, the beam pattern provides horizontal coverage (the expected horizontal scan vector component resulting from 45° antenna scanning), but beam pattern extension and coverage vertically is constrained (i.e., each element remains subject to its respective radiation pattern cut-off characteristic at the 3 dB points vertically). Thus, in addition to limiting azimuth error due to multipath transmission, the embodiment of FIGS. 1 and 2 provides a reduction of undesired vertical beam pattern extension or coverage in operation of a diagonally oriented linear array antenna.

Figure 4D:
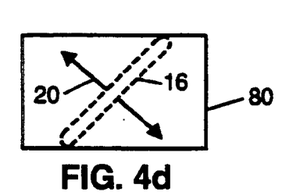

As described, antenna system 10 is effective to provide a diagonal fan-type beam 14 having a cross-section with an elongated dimension normal to a narrower dimension, with the elongated dimension diagonally oriented relative to the vertical coordinate. Operationally, the fan beam of cross-section shown at 14 in FIG. 4c is produced by the linear array of elements 26a to 26n positioned along diagonal line 28 in FIG. 2 and is scanned diagonally by adjustment of phase shift modules 38a to 38n to produce relative phase adjustments of signal portions coupled to individual ones of the radiating elements under the control of scan control means 46 of FIG. 1. Each of the radiating elements 26a to 26n in this embodiment is a vertically aligned slotted waveguide section, which will be described in greater detail with reference to FIG. 6. The ideal radiating element would have a radiation sector pattern that closely approximates the required coverage sector as represented by approach window 80. The array pattern of an array antenna is a product of the element pattern and the array factor pattern. Thus, by using vertically aligned slotted waveguide elements in the diagonal line array, the radiating pattern of each element is constrained, or focused, vertically, but extends broadly horizontally so as to provide a horizontal window effect which constrains radiation outside of the desired vertical limits of the enhanced approach window, even though the antenna array as a whole provides a diagonally-oriented beam which is nominally scanned diagonally. Correspondingly, FIG. 4d shows the fan-shaped beam 16, of the second diagonal scan antenna system 12, which has a +45° diagonal orientation relative to vertical and is nominally scanned along a −45° direction as indicated by dual-direction arrow 20.

It will now be appreciated that in the X-scan aircraft location system, the two beams 14 and 16 are simultaneously scanned transversely to each other to provide coverage in the approach window 80. Also, while the narrow dimension beamwidth of beams 14 and 16 may typically be specified as 0.7° at the 3 dB power level, the elongated dimension (normal to the 0.7° dimension) is nominally shown for purposes of illustration as coextensive with the height of approach window 80. However, in practice the elongated dimension must be somewhat larger in order to provide adequate coverage as the beams are scanned relative to the enhanced approach window (as described above with reference to pitch and roll effects).

There is thus disclosed, in accordance with the invention, a method for determining aircraft location by use of diagonally-oriented fan-type antenna beams. In accordance with this method a first diagonal fan-type antenna beam is provided and has a beam cross-section 14 with an elongated dimension (i.e., the dimension of beam cross-section 14 perpendicular to arrow 18 in FIG. 4c) which is normal to a narrower dimension (i.e., the dimension of beam cross-section 14 along arrow 18 in FIG. 4c). As previously described, the elongated dimension of beam cross-section 14 is diagonally oriented at a first angle (i.e., −45°) relative to the vertical coordinate V shown in FIG. 1. The first antenna beam is scanned in a direction which is transverse to the elongated dimension of the cross-section of beam 14. Upon an aircraft entering the approach window 80 scanned by the first beam, the beam will be incident upon the aircraft. By receiving and processing signals representative of the beam incidence, incidence data representative of the time of incidence of the first antenna beam at the location of the aircraft is derived. More particularly, such data may represent the relative timing of the beam incidence as it scans. Incidence data may be similarly derived for a second antenna beam. In this method, the incidence data is then utilized together with data representative of the known scanning cycles or positions of the scanned antenna beams to derive data representative of the azimuth of the aircraft relative to a reference position, such as the antenna 10 or, by transposition of data, the position of the carrier landing deck. Range data is also typically utilized in such data derivation, which may also provide aircraft elevation data.

In particular applications, electromagnetic energy of the scanned antenna beam may be received by an antenna 23 and associated receiver 24 carried in the aircraft 22 and aircraft location data may then be derived by signal processing equipment on the aircraft (i.e., unit 48) or derived by such equipment aboard the aircraft carrier (i.e., unit 52) after transmittal of the incidence data from the aircraft to the carrier. Alternatively, it may be desirable to derive such incidence data based upon receiving reflections of electromagnetic energy back toward a carrier-based antenna, in a radar type arrangement or by use of a radar beacon type arrangement with radiations from the aircraft in response to directed requests. Upon such incidence data becoming available, data as to the known timing of the beam scanning permits derivation of aircraft location data. Such information as to the azimuth and altitude of the aircraft relative to the carrier deck, for example, can be augmented and stabilized by use of range data derived from the timing of reference signals transmitted between the aircraft and aircraft carrier unit 58 and roll and pitch data developed in known manner by other equipment aboard the aircraft carrier can be provided to processor 52 via terminals 53.

Operationally, a single diagonally oriented, scanned fan-type beam may be utilized to derive aircraft location data in combination with an airborne altimeter, such as a radar altimeter carried aboard the aircraft, or in combination with a vertically scanned array, capable of enabling aircraft altitude to be determined, or in combination with a second diagonally oriented, scanned fan-type beam transversely oriented relative to the first such beam, as described above. In any of these cases, with available range information sufficient data can be provided to permit derivation of data representative of the position of an aircraft relative to an aircraft carrier or some other reference location, while at the same time limiting loss of accuracy as a result of reflections under pitch and roll conditions. Since such position determinations can be made substantially instantaneously as beam incidence data is developed, the resulting aircraft location information is useful in monitoring and correcting the flight of an aircraft along the flight path to touchdown on an aircraft carrier even in the presence of a range of magnitudes of ship pitch and roll and sea surface conditions.

Other Elements of the Invention

Figure 5:
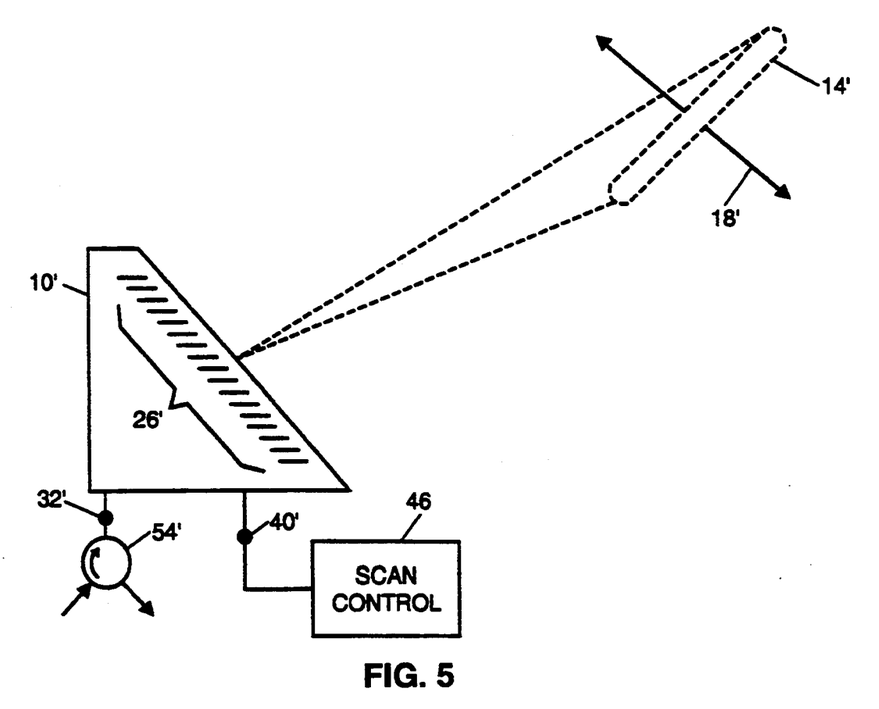
FIG. 5 shows a linear array antenna system incorporating horizontally oriented radiating elements.

FIG. 5 illustrates a linear array antenna system 10' which, in accordance with the invention, is arranged to provide a diagonally oriented, scanned fan beam having a cross-section as indicated at 14', by operation of diagonal array of horizontally oriented radiating elements 26'. Thus, in an appropriate application, antenna system 10' may simply take the form of antenna system 10 of FIG. 2 rotated by 90°, so that each of the individual slotted-waveguide radiating elements 26a to 26n is oriented horizontally rather than vertically. For example, in a helicopter landing system or other application, it may be desirable to scan a portion of space having an aspect ratio which is smaller than that of approach window 80 of FIG. 4a, so that scanned height may be greater than the scanned width. This result can be provided with the FIG. 5 antenna system operating with appropriate scan control signals in known manner to provide the desired coverage while electronic scanning is implemented diagonally as indicated by dual-direction arrow 18'. Correspondingly, as in FIG. 1, two FIG. 5 type antenna systems operating together with beams transversely scanned provide the X-scan aircraft location capabilities of the FIG. 1 system. In either case, scanned, diagonally oriented fan beams are used in the derivation of horizontal and vertical position information, i.e., azimuth and altitude data. And, in addition, even though the beams are oriented diagonally, the benefits of horizontal and vertical radiating element coverage factors are achieved.

Figure 6:
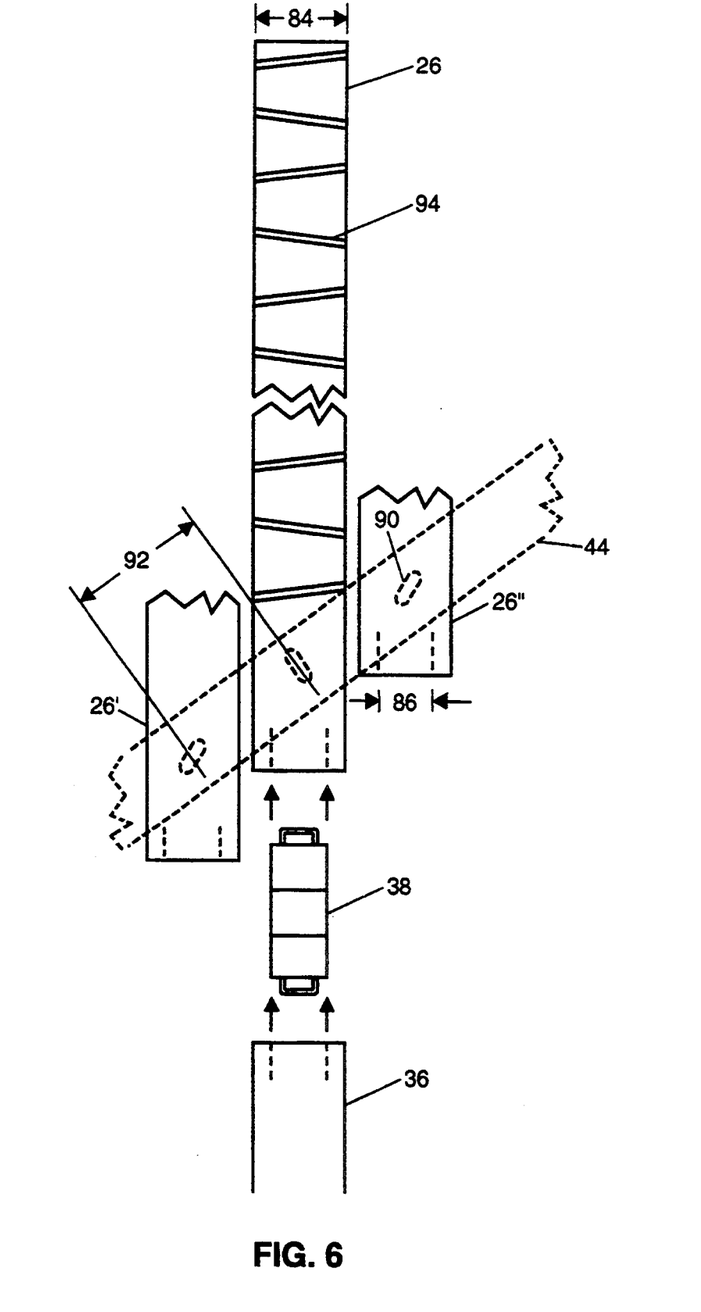
FIG. 6 shows a vertical slotted-waveguide radiating element and associated interconnecting waveguide and phase shift module.

Referring now to FIG. 6, there is shown more detail as associated with the form of slotted waveguide element used in the described embodiment of the invention. In FIG. 6, slotted waveguide column 26 is a representative one of radiating elements 26a to 26n of FIG. 2, waveguide portion 36 is the upper end of one of connecting lines 36a to 36n of FIG. 2, and phase shift module 38 is one the phase shift means 38a to 38n of FIG. 2. As will be further described with reference to FIG. 7, phase shift module 38 is dimensioned to fit within the adjacent ends of the radiating element 26 and connecting line 36, which are made from sections of a standard metallic waveguide, such as type WR-51. Indicated dimensions of such waveguide are typically $84=0.335\lambda$ and $86=0.255\lambda$. As indicated in FIG. 6, the adjacent radiating elements, shown by the lower ends of identical slotted waveguides 26' and 26", are vertically aligned in parallel with, and adjacent to, element 26 along a diagonal inclined at 45° to vertical. In dotted outline there is shown a special waveguide 44 which is inclined at 45°, extends behind the radiating elements, and is coupled to each radiating element through a coupling hole such as 90, also shown dotted. In this embodiment coupling holes 90 had a typical separation of $0.48\lambda$, as shown at 92. Waveguide 44 is of use in a monitor arrangement permitting the relative phase of signals in each radiating element 26a to 26n to be monitored on a substantially continuous basis to permit automatic adjustment for out of tolerance signal phasing without requiring physical adjustment or compensation for phase discrepancies arising from manufacturing and assembly tolerances or arising during system operation. Monitor waveguide 44 and the monitoring and automatic phase adjustment capabilities may be provided in antenna systems using the invention according to the teaching of U.S. Pat. No. 4,554,550, "RESONANT WAVEGUIDE APERTURE MANIFOLD", which has a common assignee with the present invention. While inclusion of monitor waveguide 44 may be beneficial in applications of the invention, it is not a necessary element in all applications of the invention.

As shown in FIG. 6, radiating element 26 is a vertical waveguide column having in one of its broad walls a plurality of slots 94 which are designed with dimensions and orientation effective to radiate energy with vertical polarization to provide predetermined forward coverage. In other applications forms of slotted waveguides or other radiating elements, such as dipoles, may be arranged with vertical or horizontal orientation. The form and dimensions of the radiating elements, the angle of the diagonal line along which the elements are positioned, and the vertical or horizontal orientation are design variables to be determined to meet the particular applicational requirements.

Figure 7:
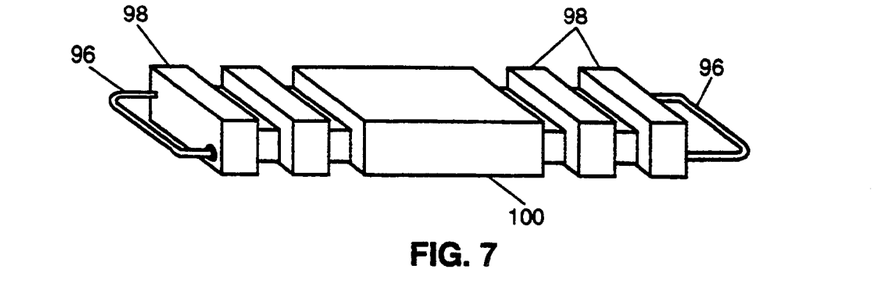
FIG. 7 shows a phase shift module dimensioned for positioning internal to standard waveguide sections.
Figure 8:
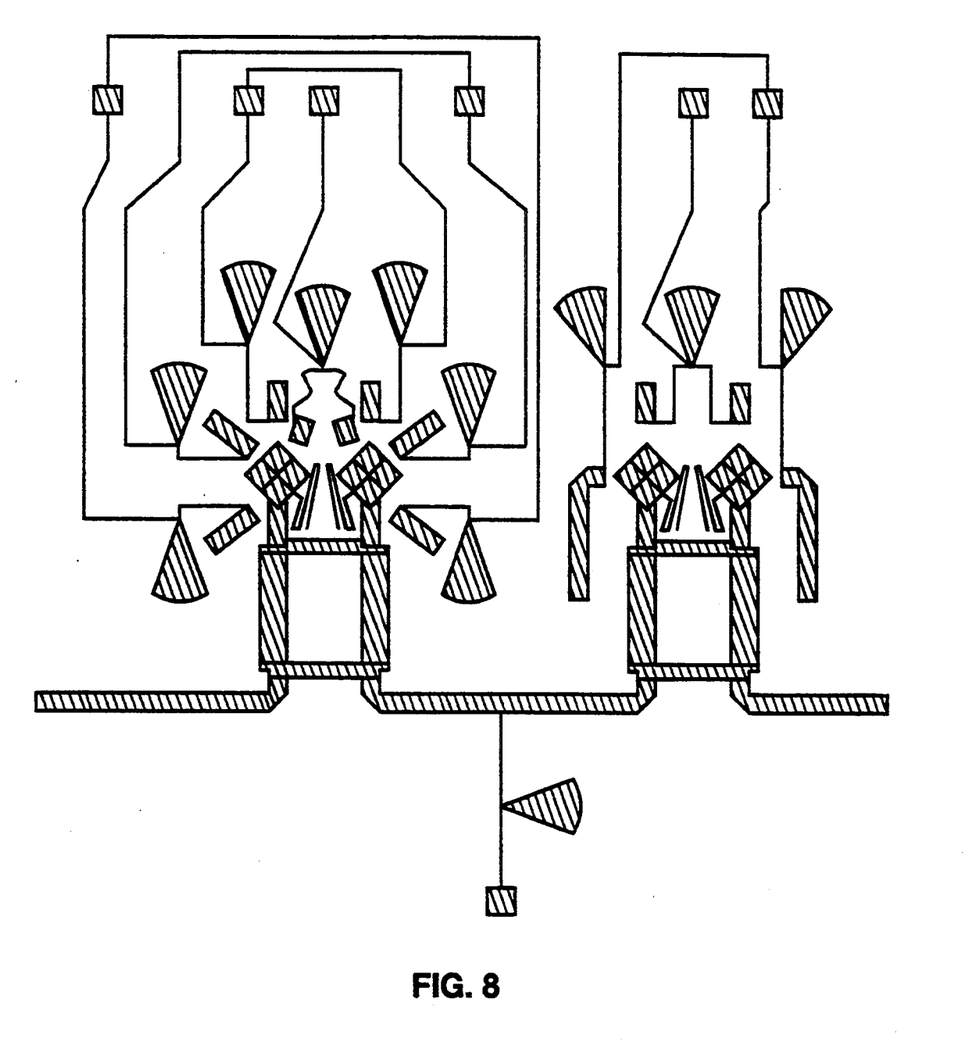
FIG. 8 shows microstrip artwork for the FIG. 7 phase shift module.

In FIG. 7 there is shown a form of phase shifter module 38 for use in antenna systems in accordance with the invention. As illustrated, module 38 includes waveguide coupling probes 96 for coupling energy to and from the interior of the waveguide sections of elements 26 and 36, non-contacting waveguide shorts 98 for providing predetermined waveguide operating characteristics, and central circuitry package portion 100. FIG. 8 provides an illustration of one form of microstrip artwork for a pin-diode phase shifter constructed on an alumina substrate. In operation, the 4-bit phase shifter provides sixteen levels of phase shifting, to permit relative phase adjustments of signal portions supplied to the linear array of radiating elements to enable scanning of the beam radiated by the antenna system. As previously discussed, scan control unit 46 provides control signals to the phase shifter modules to control beam scanning.

While there have been described what are currently considered to be the preferred embodiments of the invention, those skilled in the art will recognize that other and further variations and modifications may be made without departing from the true scope of the invention, and it is intended to claim all such variations and modifications as fall within the scope of the invention.

What is claimed is:

1. An X-scan aircraft location system comprising;
    a linear array first antenna system for providing a first antenna beam pattern having a first diagonal orientation relative to vertical and horizontal normal coordinates, said first antenna system including a linear array of radiating elements positioned along a first line diagonal to said normal coordinates, all of said radiating elements having a substantially parallel alignment with one of said normal coordinates;
    a linear array second antenna system for providing a second antenna beam pattern having a second diagonal orientation transverse to said first diagonal orientation, said second antenna system including a linear array of radiating elements positioned along a second line diagonal to said normal coordinates and transverse to said first line, all of said radiating elements having a substantially parallel alignment with one of said normal coordinates;

scan control means, coupled to said first and second antenna systems, for controlling relative phase of signals coupled to respective ones of said radiating elements of each of said first and second antenna systems to cause said first and second antenna beam patterns to be scanned transversely to each other; and processor means for utilizing data representative of time of incidence of said first and second antenna beam patterns at the location of an aircraft in determining the azimuth of said aircraft relative to a reference location.

2. An X-scan aircraft location system as in claim 1, wherein said radiating elements of said first and second antenna systems are aligned vertically and positioned along lines at 45° angles relative to vertical, and said first and second antenna beam patterns have diagonal orientations at 45° angles to vertical and transversely to each other.

3. An X-scan aircraft location system as in claim 1, additionally including means, coupled to said processor means, for providing data representative of the range of said aircraft relative to said antenna systems.

4. A linear array antenna system, for providing scan coverage in a dimension normal to a first coordinate by an antenna beam pattern of diagonal orientation, comprising:

a linear array of radiating elements which are each in substantially parallel alignment with said first coordinate, each of said radiating elements having a predetermined radiation pattern characteristic in the dimension of said first coordinate;

positioning means, coupled to said radiating elements, for positioning said radiating elements along a line diagonal to said first coordinate; and scan control means, coupled to said radiating elements, for controlling relative phase of signals coupled to respective ones of said radiating elements to provide a scanned antenna beam pattern having a fan-type profile which is diagonal to said first coordinate and which is constrained in the dimension of said first coordinate by said predetermined radiation pattern characteristic of said radiating elements.

5. A linear array antenna system as in claim 4, wherein: said first coordinate is vertical and the antenna system provides horizontal scan coverage; said radiating elements are vertically aligned; and said predetermined radiation pattern characteristic is a vertical bandwidth value for the radiation pattern of each of said radiating elements.

6. A linear array antenna system as in claim 5, wherein said scan control means controls relative phase differences between signals associated with radiating elements spaced along said line diagonal, thereby providing horizontal scanned beam coverage with vertical coverage constrained by said vertical beamwidth value of said vertically aligned radiating elements.

7. A linear array antenna system as in claim 4, wherein each of said radiating elements is a vertically aligned slotted waveguide column operating with vertical polarization and having a predetermined vertical radiation pattern characteristic, and said positioning means comprise waveguide portions coupled to said slotted waveguide columns.

8. A linear array antenna system as in claim 4, wherein said linear array of radiating elements comprises a plurality of horizontally aligned radiating elements which are positioned along said line diagonal to said first coordinate.

9. A linear array antenna system as in claim 4, additionally comprising a second linear array of radiating elements and second positioning means for positioning said second linear array of radiating elements along a second line diagonal to said first coordinate, and wherein said scan control means controls relative phase of signals coupled to said radiating elements of the respective linear arrays to produce antenna beam patterns scanned transversely to each other.

10. A linear array antenna system as in claim 9, wherein said linear arrays of radiating elements each comprise a plurality of vertically aligned radiating elements positioned along said respective lines diagonal to said first coordinate.

11. A diagonal scan aircraft location system as in claim 9, wherein each of said radiating elements is a vertically aligned slotted waveguide column operating with vertical polarization.

12. A linear array antenna system, for providing an antenna beam pattern of diagonal orientation relative to vertical and horizontal normal coordinates, comprising:

a linear array of radiating elements positioned along a line diagonal to said normal coordinates, each said radiating element having a substantially parallel alignment with one of said normal coordinates;

input line means, including an input port and coupling points successively spaced from said input port, for providing at successive coupling points signal portions which are subject to successively longer time delays;

a plurality of connecting line means of successively shorter electrical lengths for coupling signal portions from said successively spaced coupling points to said radiating elements to provide successively shorter time delays substantially compensating for said successively longer time delays;

phase shift means, coupled to said radiating elements, for enabling relative phase adjustments of said signal portions coupled to said radiating elements; and scan control means, coupled to said phase shift means, for controlling said relative phase adjustments to cause said antenna beam pattern as provided by said array of radiating elements to scan in a direction transverse to said diagonal orientation of said antenna beam pattern.

13. A linear array antenna system as in claim 12, wherein said radiating elements are aligned vertically and positioned a long a line at a 45° angle relative to vertical, and said antenna beam pattern has a diagonal orientation at a 45° angle to vertical.

14. A linear array antenna system as in claim 13, wherein each of said radiating elements is a vertically aligned slotted waveguide column operating with vertical polarization.

15. A linear array antenna system as in claim 14, wherein said input line means comprises a traveling-wave waveguide feed having a directional coupler at each said coupling point for coupling signal portions to said connecting line means.

16. A linear array antenna system as in claim 12, wherein:

each of said radiating elements comprises a slotted waveguide section aligned vertically;

said input line means comprises a horizontally aligned section of waveguide of similar electrical characteristics to said slotted waveguide section radiating elements; and said connecting line means comprise vertically aligned waveguide sections of successively shorter lengths connected between said slotted waveguide radiating elements and said coupling points successively spaced from said input port.

17. A linear array antenna system as in claim 16, wherein said phase shift means includes phase shift modules positioned within the adjacent ends of the waveguide sections comprising said radiating elements and said interconnecting waveguide sections.

18. A linear array antenna system as in claim 12, wherein:

each of said radiating elements is aligned horizontally;

said input line means comprises a section of transmission line aligned vertically; and said connecting line means comprise sections of transmission line aligned horizontally.

19. An X-scan antenna system comprising two linear array antenna systems as in claim 12, the first said linear array antenna system having radiating elements positioned along a first line diagonal to a vertical coordinate and the second said linear array antenna system having radiating elements positioned along a second line which is both diagonal to said vertical coordinate and transverse to said first line, and said X-scan antenna system additionally including processor means for utilizing data representative of time of incidence of the antenna beam patterns, provided by said first and second linear array antenna systems, at the location of an aircraft in determining the azimuth of said aircraft relative to a reference location.

20. An X-scan antenna system as in claim 19, additionally including means, coupled to said processor means, for providing data representative of the range of said aircraft relative to said X-scan antenna system.

21. A method for determining aircraft azimuth relative to a seagoing vessel subject to roll, comprising the steps of:

(a) mounting an antenna system on a seagoing vessel at a position from which communication transmissions with an airborne aircraft are subject to multipath sea reflections;

(b) providing, from said antenna system, a diagonal fan-type first antenna beam pattern having a beam cross-section with an elongated dimension which is diagonally oriented at a first angle relative to a vertical coordinate;

(c) scanning said first antenna beam pattern;

(d) providing, from said antenna system, a diagonal fan-type second antenna beam pattern having a beam cross-section with an elongated dimension which is diagonally oriented at a second angle relative to said vertical coordinate and transversely oriented relative to said first antenna beam pattern;

(e) scanning said second antenna beam pattern;

(f) developing incidence data representative of the time of incidence of said first and second antenna beam patterns at the location of said aircraft; and (g) utilizing said incidence data to derive data representative of the azimuth of said aircraft relative to a reference position.

22. A method as in claim 21, additionally comprising the step of providing, for utilization in step (g), data representative of the range of said aircraft relative to said antenna system.

23. A method as in claim 21, including utilizing in steps (b) and (d) first and second linear arrays of vertically aligned radiating elements in respectively providing said first and second antenna beam patterns.

* * * * *